United States Patent [19]
Koga et al.

[11] Patent Number: 4,655,963
[45] Date of Patent: Apr. 7, 1987

[54] ELECTROCONDUCTIVE RESIN COMPOSITION USING FLUORINE-CONTAINING GRAFT COPOLYMER

[75] Inventors: Yasufumi Koga, Tokorozawa; Shinji Ogasawara, Kamifukuoka; Kazuhiko Maeda, Tokyo, all of Japan

[73] Assignee: Central Glass Company, Limited, Ube, Japan

[21] Appl. No.: 797,462

[22] Filed: Nov. 13, 1985

[30] Foreign Application Priority Data

Nov. 14, 1984 [JP] Japan .................. 59-238235

[51] Int. Cl.$^4$ ................. H01B 1/06
[52] U.S. Cl. ............... 252/511; 524/495; 524/496; 525/72; 525/276
[58] Field of Search ........... 252/511, 502; 524/495, 524/496; 525/72, 276, 263

[56] References Cited

U.S. PATENT DOCUMENTS

| | | | |
|---|---|---|---|
| 4,472,557 | 9/1984 | Kawashima et al. | 525/276 |
| 4,482,476 | 11/1984 | Yoshimura et al. | 524/496 |
| 4,491,536 | 1/1985 | Tomeda et al. | 252/511 |
| 4,581,406 | 4/1986 | Hedberg et al. | 524/495 |
| 4,592,861 | 6/1986 | Bekele et al. | 252/511 |

FOREIGN PATENT DOCUMENTS 49-11911 2/1974 Japan.
52-44860 4/1977 Japan.

Primary Examiner—Josephine L. Barr
Attorney, Agent, or Firm—Fleit, Jacobson, Cohn & Price

[57] ABSTRACT

Disclosed is an electroconductive and thermoplastic resin composition which is comprised of 99–80 parts by weight of a fluorine-containing graft copolymer and 1–20 parts by weight of carbon black. The graft copolymer is one obtained by graft copolymerization of a fluorine-containing monomer that gives a crystalline polymer, such as vinylidene fluoride, with a fluorine-containing elastomeric copolymer having peroxy bond, such as a ternary copolymer of vinylidene fluoride, chlorotrifluoroethylene and an unsaturated peroxy compound. To attain good conductivity while maintaining favorable mechanical properties of the fluorine-containing graft copolymer, it is essential to use a carbon black which is not smaller than 500 $m^2/g$ in specific surface area and not smaller than 250 ml/100 g in oil absorption.

9 Claims, No Drawings

ELECTROCONDUCTIVE RESIN COMPOSITION USING FLUORINE-CONTAINING GRAFT COPOLYMER

BACKGROUND OF THE INVENTION

This invention relates to an electroconductive resin composition which is comprised of a thermoplastic fluorine-containing copolymer and carbon black.

Recently demands for electroconductive resins have been increasing in various and widening fields of industry. It has already been revealed that several kinds of organic polymers containing specific dopants exhibit good conductivity. However, practicable electroconductive resins using such polymers are still under development and there is a long distance toward wide purpose applications by solution of technical problems in various aspects. Therefore, electroconductive resins currently on the market are all composite materials obtained by adding conductive fillers to commonly used resins.

The conductivities of conventional electroconductive resins of the composite type cover a wide range. For example, conductive resins having volume resistivity of $10^0$–$10^4$ $\Omega \cdot$cm are largely used in plate heaters, radio wave shields, cables, conductive films, etc., while more highly conductive resins having volume resistivity of $10^{-3}$–$10^0 \Omega \cdot$cm are used in printed circuits, cell electrode terminals, contacts of electronic calculators, connectors, gaskets, radio wave shields, conductive paints, conductive adhesives, etc.

For conventional electroconductive resins, conductive fillers are selected from carbon black, metal powders and metal fibers with consideration of related factors such as physical properties of the matrix resin, desired conductivity and intended uses of the products. At present carbon black is most widely used as the conductive filler, and it is well known that various degrees of conductivity can be attained by selectively using carbon black of different grades, selecting the matrix resin to which carbon black is added and/or selecting and controlling the process of preparing a conductive resin and shaping it into a desired form.

Polymers useful or considered to be useful for producing conductive resins by combining with carbon black include some fluorine-containing polymers which are known for their excellent resistance to chemicals and weathering as well as good mechanical properties. A typical example of such fluorine-containing polymers is polytetrafluoroethylene (PTFE). There are proposals of electroconductive paints and mouldable conductive resins using a fluorine-containing polymer and carbon black. However, coating films and shaped bodies according to these proposals are generally higher than about 10 $\Omega \cdot$cm in volume resistivity. To further reduce the resistivity by increasing the amount of carbon black, there arises the need of taking a certain compensating measure such as incorporation of an extra additive for preventing degradation of the mechanical properties of the products.

SUMMARY OF THE INVENTION

It is an object of the present invention to provide an electroconductive and thermoplastic resin composition which is of the above described composite type using a fluorine-containing polymer and carbon black and possesses sufficiently high conductivity and very good mechanical properties.

The present invention provides an electroconductive resin composition which comprises 99 to 80 parts by weight of a fluorine-containing graft copolymer, which is obtained by graft copolymerization of a fluorine-containing monomer that gives a crystalline polymer with a fluorine-containing elastomeric copolymer having peroxy bonds that decompose at the graft copolymerization stage, and 1 to 20 parts by weight of carbon black substantially uniformly dispersed in the graft copolymer. It is essential that the carbon black is not smaller than 500 m$^2$/g in specific surface area and is not less than 250 ml/100 g in oil absorption for dibutyl phthalate (DBP).

This invention has overcome the disadvantages of hitherto proposed electroconductive resins comprised of a fluorine-containing polymer and carbon black by employing a combination of a fluorine-containing copolymer of a specific class and carbon black of a specific grade. Fluorine-containing graft copolymers used in this invention are disclosed in U.S. Pat. No. 4,472,557. These copolymers are excellent in mechanical properties, chemical resistance, weather resistance and also in mouldability. A preferred example is one obtained by graft copolymerization of vinylidene fluoride (VDF) with an elastomeric copolymer of VDF, chlorotrifluoroethylene and an unsaturated peroxy comound.

In general, fluorine-containing resins are higher in specific gravity than commonly used resins of the hydrocarbon family. Accordingly, a given weight of carbon black occupies a larger volume in the former resins than in the latter resins, and naturally it is expectable that when a fluorine-containing resin is used a sufficiently high conductivity will be attained by the addition of a relatively small weight of carbon black. This is true. For example, a resin composition obtained by blending PVDF with 5 wt % of carbon black of a specific grade exhibits very low resistivity of the order of $10^0$–$10^1 \Omega \cdot$cm when measured in a moulded form. However, such a composition becomes significantly inferior to PVDF in mechanical properties, particularly in elongation and impact resistance, and therefore offers problems to practical uses. As a countermeasure, it was tried to accomplish internal plasticization of PVDF by suitable copolymerization. However, this measure resulted in lowering of the conductivity of the product by reason of reduced diffusion of carbon black into the noncrystalline part of the copolymer. In the combination of the resin and carbon black employed in this invention, such problems are insignificant.

A conductive resin according to the invention possesses good conductivity even though the content of carbon black is relatively low, and retains excellent physical properties of the fluorine-containing graft copolymer used as the matrix resin. The latter advantage is attributed to the use of carbon black sufficiently large in specific surface area and also to the avoidance of using any other additive. The conductivity of a resin composition according to the invention can arbitrarily be controlled over a wide range, viz. from $10^1$ to $10^6 \Omega \cdot$cm in terms of volume resistivity, by controlling the amount of carbon black. This resin composition can easily be moulded or extruded into desired shapes. This conductive resin composition is useful not only in the electric and electronic fields but also in chemcial plants since advantages of fluorine-containing resins can be obtained. For example, this resin composition will be used in cables, antistatic sheets and belts, plate heaters, plate switches, cell electrode terminals, contacts of electronic calculators, connectors, gaskets, packaging materials and containers for inflammable organic materials.

DESCRIPTION OF THE PREFERRED EMBODIMENTS

The fluorine-containing graft copolymer used in this invention and methods of producing the same are shown in U.S. Pat. No. 4,472,557. The basic or "trunk" part of the graft copolymer is an elastomeric copolymer, which is obtained by copolymerizing at least one kind of fluorine-containing monomer and another kind of monomer that has both double bond and peroxy bond (such a monomer will be called an unsaturated peroxide) at a temperature at which the peroxy bond in the unsaturated peroxide does not decompose. Examples of useful unsaturated peroxides are t-butyl peroxymethacrylate, t-butyl peroxyallylcarbonate, di(t-butylperoxy)fumarate, t-butyl peroxycrotonate and p-menthane peroxyallylcarbonate. Accordingly the elastomeric copolymer has peroxy bonds in side chains. For example, the elastomeric copolymer is a ternary copolymer of vinylidene fluoride (VDF), hexafluoropropene (HFP) and an unsaturated peroxide, a ternary copolymer of VDF, chlorotrifluoroethylene (CTFE) and an unsaturated peroxide or a quaternary copolymer of VDF, HFP, tetrafluoroethylene (TFE) and an unsaturated peroxide. The copolymerization reaction is carried out by using a radical polymerization initiator. As to the manner of copolymerization reaction, emulsion polymerization using an emulsifying agent, suspension polymerization using a suspension stabilizing agent or solution polymerization using either an organic solvent or a mixture of water and an organic solvent is desirable.

Next, a fluorine-containing crystalline polymer is grafted to the basic elastomeric copolymer by polymerizing a suitable fluorine-containing monomer in the presence of the elastomeric copolymer at a temperature high enough to decompose the perox bonds in the elastomeric copolymer. For example, VDF, TFE, mixture of TFE and ethylene, mixture of TFE and HFP, mixture of TFE and perfluorovinyl ether, CTFE or mixture of CTFE and ethylene is used as the fluorine-containing monomer. It is suitable to carry out the graft copolymerization reaction in the manner of emulsion polymerization, suspension polymerization or solution polymerization. There is no need of using a radical polymerization initiator since graft copolymerization is initiated by decomposition of the peroxy bonds in the elastomeric copolymer. In general the elastomeric copolymer used herein as the "trunk" part of the graft copolymer has a glass transition temperature below room temperature, and the grafted crystalline polymer has a melting point not lower than 130° C.

A conductive resin composition is obtained by substantially uniformly dispersing carbon black in a fluorine-containing graft copolymer of the above described class. In this invention it is essential to use a carbon black which is not smaller than 500 $m^2/g$ in specific surface area and is not less than 250 ml/100 g in oil absorption for DBP. When the specific surface area is smaller than 500 $m^2/g$ such a carbon black is inferior in dispersibility in the resin, and articles formed of the resulting conductive resin composition will possibly exhibit unexpected and irregular lowering of conductivity due to defective bonds between carbon particles. When the oil absorption of carbon black is less than 250 ml/100 g it is difficult to obtain a sufficiently conductive resin composition without undesirably increasing the content of carbon black.

Carbon black suitable for use in this invention can be found, for example, among furnace black and acetylene black on the market.

In a conductive resin composition according to the invention the content of carbon black is limited within the range from 1 to 20 wt %. When the content of carbon black is less than 1 wt % the mixture of the copolymer and carbon black has a volume resistivity of $10^9$ $\Omega$·cm or above and therefore is regarded as an insulator. When the carbon black content is more than 20 wt % the conductive resin composition cannot easily be moulded or extruded, and even if it can be moulded or otherwise shaped the shaped bodies will lack in practicability due to insufficiency of mechanical strength. It is preferred that the content of carbon black in a conductive resin composition of the invention falls in the range from 3 to 10 wt %.

Blending of a selected fluorine-containing graft copolymer with carbon black can be accomplished by any method that is applicable to blending of conventional thermoplastic resins containing powdery additive. That is, the graft copolymer and carbon black are blended and kneaded under appropriate heating in a conventional mixer such as Henschel mixer, V-shaped blender, ribbon blender, planetary mixer of Banbury mixer. The obtained blend is a thermoplastic material that can easily be formed into desired shapes by selectively using conventional shaping methods for thermoplastic resins, such as extrusion, compression moulding, injection moulding, calendering and press-shaping. In the cases of conventional conductive resin compositions using carbon black, it is not seldom that the shaped products becomes unexpectedly low in conductivity by reason of destruction of the carbon structure. Therefore, it is necessary to strictly control some items of the kneading and shaping conditions such as temperature, time and kneading torque. In the case of a conductive resin composition according to the invention the conductivity is not greatly affected by the kneading and shaping conditions, so that shaped products are obtained with good reproducibility in respect of conductivity.

The invention will further be illustrated by the following nonlimitative examples.

EXAMPLE 1

A fluorine-containing elastomeric copolymer was prepared by the following process.

Initially, 1500 g of purified water, 37.5g of potassium persulfate, 3.8 g of ammonium perfluorooctanoate and 25.6 g of t-butyl peroxyallylcarbonate (BPAC) were put into a 30-liter stainless steel autoclave. After purging the gas atmosphere, 3000 g of VDF monomer and 1410 g of CTFE monomer were charged into the autoclave. The resultant mixture was subjected to copolymerization reaction at 48° C. for 22 hr with continuous stirring. The slurry containing the reaction product was subjected to salting-out and then was filtered to recover a VDF/CTFE/BPAC copolymer in the form of powder, which was repeatedly washed with water and dried in a rotary drier at 60° C. for 16 hr. The moisture content in the dried copolymer was 0.1 wt %. The yield of the copolymer was 89.8%.

To prepare a fluorine-containing graft copolymer, 7670 g of the above VDF/CTFE/BPAC copolymer and 53,300 g of trichlorotrifluoroethane were charged into a 75-liter stainless steel autoclave. After purging the gas atmosphere, VDF monomer was continuously introduced into the autoclave to carry out graft copolymerization reaction at 98° C. while the pressure in the autoclave was kept at 12 kg/cm$^2$ (gauge pressure). The reaction was continued for 24 hr with continuous stirring. The slurry containing the reaction product was filtered, and the solid matter was dired in a rotary drier at 60° C. for 24 hr. As the result 10,900 g of a fluorine-containing graft copolymer in powder form was obtained.

The above graft copolymer was mixed with a commercial furnace black which had a specific surface area of 950 m$^2$/g and exhibited an oil absorption value of 400 ml/100 g (for DBP). The mixing ratio was varied to prepare three sample mixtures which contained 1.6 wt %, 4.8 wt % and 9.1 wt % of furnace black, respectively. Each mixture was roll-kneaded at 190° C. for 5 min and then was shaped into a 100–200 μm thick film by press-shaping operation which was carried out by application of a pressure of 50 kg/cm$^2$ (gauge pressure) for 5 min to the mixture heated at 220° C.

Important items of the physical properties of the thus produced conductive resin films were as shown in Table 1. The measurement of volume resistivity was made in air at room temperature by the four-probe method. Tensile strength and elongation were measured by the method according to ASTM D 638. The hardness values are on the Shore D scale.

EXAMPLE 2

The graft copolymer prepared in Example 1 was mixed with a commercial furnace black of another grade, which had a specific surface area of 1250 m$^2$/g and exhibited an oil absorption value of 480ml/100 g (for DBP). In this case the content of furnace black in the mixture was 12 Wt%. This mixture was processed into a film by the same method as in Example 1. Table 1 contains the physical properties of this conductive resin film.

COMPARATIVE EXAMPLE 1

The graft copolymer prepared in Example 1 was shaped into a film without adding furnace black or any other conductive material. Table 1 contains the physical properties of this film and conductive resin films produced in the following Comparative Examples.

COMPARATIVE EXAMPLE 2

A commercial polyvinylidene fluoride (PVDF) resin, Kynar 460 of Pennwalt Co., was mixed with the furnace black used in Example 1 to obtain a mixture containing 9.1 wt % of furnace black. The mixture was kneaded and shaped into a film by the same process as in Example 1.

COMPARATIVE EXAMPLE 3

The graft copolymer prepared in Example 1 was mixed with a commercial furnace black of a different grade, which had a specific surface area of 250 m$^2$/g and exhibited an oil absorption value of 185 ml/100 g (for DBP). The mixing ratio was varied to prepare two sample mixtures which contained 9.1 wt % and 16.7 wt % of furnace black, respectively. Each mixture was kneaded and shaped into a film by the same process as in Example 1.

TABLE 1

| | Carbon Black Content (wt %) | Volume Resistivity (Ω · cm) | Tensile Strength (kg/cm$^2$) | Elongation (%) | Hardness (Shore D Scale) |
|---|---|---|---|---|---|
| Ex. 1 | 1.6 | 2.8 × 10$^8$ | 220 | 510 | 43 |
| | 4.8 | 3.6 × 10$^2$ | 204 | 350 | 52 |
| | 9.1 | 1.1 × 10$^1$ | 182 | 220 | 57 |
| Ex. 2 | 12.0 | 0.8 × 10$^0$ | 179 | 210 | 60 |
| Comp. Ex. 1 | 0 | 1.4 × 10$^{13}$ | 229 | 470 | 40 |
| Comp. Ex. 2 | 9.1 | 5.6 × 10$^0$ | 455 | 0 | 79 |
| Comp. Ex. 3 | 9.1 | 1.0 × 10$^6$ | 160 | 200 | 48 |
| | 16.7 | 3.1 × 10$^4$ | 183 | 140 | 52 |

As can be seen in Table 1, the PVDF base conductive resin film of Comparative Example 2 is brittle and lacks in elongation though it is high in conductivity. In the case of Comparative Example 3 where the carbon black was considerably small in specific surface area and also in oil absorption, it was necessary to use a relatively large amount of carbon black for reducing the resistivity to a level which was easily realized in Example 1 by using a very smaller amount of carbon black. Thus. the data obtained in Examples 1 and 2 and Comparative Example 3 are demonstrative of the importance of using carbon black which has a sufficiently large specific surface area and exhibits a sufficiently large oil absorption value.

What is claimed is:

1. An electroconductive resin composition comprising:
    99 to 80 parts by weight of a fluorine-containing graft copolymer, which is obtained by graft copolymerization of a fluorine-containing monomer having crystalline structure with a fluorine-containing elastomeric copolymer having peroxy bonds that decompose at the graft copolymerization stage; and
    1 to 20 parts by weight of carbon black which is substantially uniformly dispersed in said graft copolymer, said carbon black being not smaller than 500 m$^2$/g in specific surface area and not less than 250 ml/100 g in oil absorption for dibutyl phthalate.

2. A resin composition according to claim 1, wherein the content of said carbon black in the resin composition is in the range from 3 to 10% by weight.

3. A resin composition according to claim 1, wherein said carbon black is a furnace black.

4. A resin composition according to claim 1, wherein said carbon black is an acetylene black.

5. A resin composition according to claim 1, wherein said fluorine-containing monomer comprises vinylidene fluoride.

6. A resin composition according to claim 1, wherein said fluorine-containing monomer is selected from the group consisting of tetrafluoroethylene, mixtures of tetrafluoroethylene and ethylene, mixtures of tetrafluoroethylene and hexafluoropropene, mixtures of tetrafluoroethylene and perfluorovinyl ether, chlorotrifluoroethylene, and mixtures of chlorotrifluoroethylene and ethylene.

7. A resin composition according to claim 1, wherein said fluorine-containing elastomeric copolymer is selected from the group consisting of ternary copolymers of vinylidene fluoride, hexafluoropropene and another monomer which has both double bond and peroxy bond, ternary copolymers of vinylidene fluoride, chlorotrifluoroethylene and said another monomer and quaternary copolymers of vinylidene fluoride, hexafluoropropene, tetrafluoroethylene and said another monomer.

8. A resin composition according to claim 7, wherein said another monomer is selected from the group consisting of t-butyl peroxymethacrylate, t-butyl peroxyallylcarbonate, di(t-butylperoxy)-fumarate, t-butyl peroxycrotonate and p-menthane peroxyallylcarbonate.

9. A resin composition according to claim 1, wherein said fluorine-containing graft copolymer is obtained by graft copolymerizatin of vinylidene fluoride with a fluorine-containing elastomeric copolymer of vinylidene fluoride, chlorotrifluoroethylene and another monomer which has both double bond and peroxy bond.

* * * * *